United States Patent [19]

White et al.

[11] Patent Number: 4,792,572

[45] Date of Patent: Dec. 20, 1988

[54] NOVEL PARTICULATE EXPANDABLE STYRENE POLYMERS HAVING SHORT MINIMUM MOLDING TIMES AND METHOD FOR PREPARING SAME

[75] Inventors: Thomas B. White, Keller; James J. Uebelhart, Hurst, both of Tex.

[73] Assignee: Texstyrene Plastics, Inc., Fort Worth, Tex.

[21] Appl. No.: 160,197

[22] Filed: Feb. 25, 1988

[51] Int. Cl.$^4$ .............................................. C08V 9/22
[52] U.S. Cl. ....................................... 521/57; 427/222; 521/146
[58] Field of Search .................. 521/57, 146; 427/222

[56] References Cited

U.S. PATENT DOCUMENTS

| | | | |
|---|---|---|---|
| 2,989,782 | 6/1961 | Barkhuff, Jr. et al. | 521/57 |
| 3,480,570 | 11/1969 | Goole et al. | 521/57 |
| 3,789,028 | 1/1974 | Heiskel et al. | 521/57 |
| 4,238,570 | 12/1980 | Shibata et al. | 521/57 |
| 4,281,036 | 7/1981 | Leithauser et al. | 521/57 |
| 4,361,656 | 11/1982 | Mostafa | 521/57 |
| 4,495,224 | 1/1985 | Rigler et al. | 521/57 |
| 4,696,950 | 9/1987 | Cox | 521/57 |

*Primary Examiner*—Morton Foelak
*Attorney, Agent, or Firm*—Richards, Harris, Medlock & Andrews

[57] ABSTRACT

Particulate expandable styrene polymers are coated with a distilled acetylated monoglyceride product to reduce the cooling time of articles molded from such expandable styrene polymers. Coating of the expandable particulate styrene polymer is obtained by contacting the polymer with an emulsion of a distilled acetylated monoglyceride and water with a suitable surfactant. The distilled acetylated monoglyceride is a liquid at room temperature and is substantially completely acetylated.

20 Claims, No Drawings

NOVEL PARTICULATE EXPANDABLE STYRENE POLYMERS HAVING SHORT MINIMUM MOLDING TIMES AND METHOD FOR PREPARING SAME

TECHNICAL FIELD

This invention relates to novel particulate expandable styrene polymers which have been coated with a distilled acetylated monoglyceride and a process for preparing same. The distilled acetylated monoglyceride used in the present invention is a liquid at room temperature, and is utilized in the form of an emulsion with water in the coating process set forth herein. The use of such coated particulate expandable styrene polymers in the production of molded articles reduces the cooling time during molding, without adversely affecting distribution or fusion characteristics of the molded article.

BACKGROUND OF THE INVENTION

The production of molded articles from foamed styrene polymers is well known. Such molded articles are typically manufactured by first heating expandable particles of a styrene polymer with steam to foam or expand the particles (preexpansion); allowing the preexpanded particles to "mature" for a certain period of time; introducing the preexpanded particles into a mold and heating same with steam; opening the mold after a specified cooling period, and then removing the molded article from the mold. Typically, the cooling period imparts the greatest influence upon the productivity of such process.

As noted above, the expandable particles, having been impregnated with a suitable blowing agent, are partially expanded or foamed prior to introduction into the mold for complete expansion. This preexpansion expands the particles to approximately one to six pounds per cubic foot in density from their previously unexpanded density of approximately forty-two pounds per cubic foot. The quality of the molded product is improved if the "preexpanded" particles do not form agglomerates during preexpansion. Various additives, such as zinc stearate and calcium polysilicate (ACP), are utilized to aid in the prevention of agglomeration.

After the particulate expandable styrene polymers are introduced into the mold and heated above the boiling point of the expanding agent and of the polymer softening point, the molded article must remain in the mold until the temperature drops below the softening point of the styrene polymer. Premature removal from the mold will result in articles that warp, collapse or shrink. This time required prior to ejecting the molded article from the mold is called the cooling time. Naturally, the shorter the cooling time, the faster that molded articles can be manufactured. Various coatings are therefore deposited on the surface of the particulate expandable styrene polymers in an attempt to shorten this cooling time, as well as prevent the agglomeration of particles during preexpansion.

U.S. Pat. Nos. 4,495,224, 4,238,570 and 4,189,515 disclose various methods for coating expandable styrene polymers. Included among such coating materials are fine-pored pulverulent inorganic compounds such as silicone dioxide, talcum, clay, magnesium oxide, magnesium hydroxide, magnesium carbonate, organic compounds such as waxes, metallic soaps such as magnesium or zinc stearate and esters of fatty acids or polyhydroxy compounds such as glycerin or sorbit esters. The use of such glycerin esters of long chain fatty acids is known in the art.

The above noted coating materials are deposited onto the surface of the particulate expandable styrene polymers by various methods. The objective is to obtain a uniform coating on the expandable polystyrene particles. When the coating material is a fine powder, a tumbling drum or dry mixing can be used, but uniform distribution of the coating material over the surface of the polystyrene particles is difficult to obtain. Uneven coating of the particles will lead to inconsistent processing of the molded article resulting in lower production rates.

Other attempts to obtain a uniform coating on the surface of the particulate polystyrene include the use of suspensions of the water insoluble glycerin esters in combination with an inorganic solid. U.S. Pat. No. 4,238,570 describes a method of coating expandable particles of polystyrene with an ester of an aliphatic carboxylic acid with an aliphatic alcohol which is a solid at room temperature, for example, a triglyceride of a fatty acid. According to the method disclosed therein, as compared with a triglyceride of a fatty acid which is a liquid at room temperature, the use of a solid ester reduces the blocking during preexpansion. Additional defects in the utilization of a liquid glyceride are set forth in the above-referenced patent. Further, two stated requirements of the coating composition disclosed in U.S. Pat. No. 4,238,570 are (1) that the ester have no hydroxyl group in the molecule; and (2) that the ester is a solid at room temperature (or a mixture of the ester in a finely divided lubricant). Examples of such esters include hardened beef tallow oil, hardened rapeseed oil, hardened fish oil or hardened wax.

Although the use of the above noted methods enhances the manufacturing process, it is desirable to have a process which produces a uniform coating on the surface of the particulate expandable styrene polymer and which reduces the cooling time required during the molding of articles from such polymers.

SUMMARY OF THE INVENTION

According to the present invention, particulate expandable styrene polymers are coated with a distilled acetylated monoglyceride product which consists essentially of a glyceryl monoester of a higher fatty acid which has been acetylated. The coating is achieved by contacting the particulate styrene polymer with an emulsion of the acetylated monoglyceride in water. To enhance the formation and stability of the emulsion, a surfactant is also utilized.

The coating of the particulate styrene polymer is most advantageously done prior to preexpansion, but many of the advantages of the present process can be achieved if coating occurs after preexpansion but prior to molding. When coated prior to preexpansion, the drying or "maturing" time required for the particles is greatly reduced. Further, because the coating is applied in the form of an emulsion, no blocking of the steam vents in the mold occurs. Additionally, because an emulsion is utilized, there is no dependence on obtaining a dry powder to coat the particulate polystyrene with a very fine particle size (approximately 300 mesh). Finally, no volatile organic compounds are used in the formation of the emulsion of the present invention, such that no environmental problems are posed.

DETAILED DESCRIPTION OF THE INVENTION

The present invention affects the shortening of the cooling time during molding of articles using expandable particles of a styrene polymer which have been coated with a distilled acetylated monoglyceride. The acetylated monoglyceride is a liquid at room temperature, and forms an emulsion in water in the presence of a suitable surfactant.

The acetylated monoglyceride utilized in the present invention consists essentially of a glyceryl monoester of a higher fatty acid which has been acetylated. In addition to the higher fatty acid moiety, the glyceride molecule ha two acetic acid moieties, in the case of fully acetylated monoglycerides which are preferred. The higher fatty acid moiety generally has from 8 to about 22 carbon atoms, although a higher number is possible, but not practical. Preparation of such acetylated monoglycerides is disclosed in U.S. Pat. No. 3,247,142. As noted therein, the acetylated monoglyceride products are generally prepared by interesterifying vegetable and animal fats with triacetin using soap catalysts at a concentration of about 1 to 2% by weight. Typical interesterification reaction conditions are 0.5 to 1.5 hours and 230 to 260° C. The resulting reaction product is stripped in a molecular still (about 120° C. at about 100 microns of mercury pressure) to remove acetylated glyceryl, and then distilled (about 185° C. at about 10 microns pressure) to remove catalysts, acetylated diglycerides and triglycerides.

The resulting distilled acetylated monoglyceride product utilized in the present invention is substantially completely acetylated and is a liquid at room temperature. Such a distilled acetylated monoglyceride can be obtained commercially from Eastman Chemical Products, Inc. (Health and Nutrition Division, B-280, Kingsport, Tenn. 37662) under the designation MYVACET ® 9-40.

As noted above, the distilled acetylated monoglycerides are used in the form of an emulsion in water. To enhance the formation and stability of the emulsion, an effective amount of a surfactant is utilized. Any surfactant which aids in the formation and stability of the acetylated monoglyceride and water emulsion can be used so long as no deleterious effects appear in the resulting molded article. The preferred surfactant is a polyoxyethylene (20) sorbitan monooleate commonly known as TWEEN ® 80. It is further desired to utilize additional anti-lump agents which are compatible with the acetylated monoglyceride in the coating process.

The emulsion of the present invention is preferably prepared by first mixing the surfactant and acetylated monoglyceride for approximately 5 minutes at 1750 rpm. Water is then added to this mixture and continuously mixed. The emulsion can contain from 5 to 75% by weight acetylated monoglyceride, and is preferably between 15 and 50% by weight. Sufficient quantities of surfactant should be utilized to maintain an approximately 3.5:1 ratio (by weight) of acetylated monoglyceride to surfactant although lesser amounts are acceptable. The most preferred amounts of the components of the emulsion are approximately 27.5% distilled acetylated monoglyceride, 7.5% surfactant and 65% water, all by weight.

It is preferred that the emulsion be continuously mixed during use, and if left unagitated for more than 1 hour, the emulsion begins to separate. Unused quantities of the emulsion can be stored in a sealed container for approximately 2 months, but thorough mixing is again required prior to use.

To coat the expandable particulate styrene polymers in accordance with the present invention, the coating emulsion is first prepared and then added to a mixing vessel containing the unexpanded styrene polymer. This combination is then mixed for approximately ten minutes at 65 rpm. The amount of emulsion needed to sufficiently coat the expandable styrene polymer is between approximately 0.1 to 1.0% by weight based on the weight of the polymer to be coated. Preferably, the emulsion is utilized in an amount of approximately 0.4% by weight based on the weight of the styrene polymer to be coated. Use of such a quantity of the emulsion results in particulate expandable polystyrene having approximately 405 ppm acetylated monoglyceride. After mixing, the coated styrene polymer is dried by subjecting same to dry air. The styrene polymer is then ready for packaging or preexpansion and molding.

The following table lists the average cool times of 12"×12"×2" blocks prepared from particulate expandable styrene polymers coated with various agents, as compared to blocks prepared from particulate expandable polystyrene coated with the emulsion of the present invention. The coated particles, having been preexpanded to a specified density, are introduced into a Teubert custom molding machine under controlled conditions. The cool time is measured from the time steam injection in the mold stops until the mold opens automatically when the internal pressure reaches 0.06 bar. The cool time performance is achieved by molding the material at pressures ranging from 0.9 to 1.35 bar and recording the steam time and cool time at each pressure. The average cool time is then calculated.

TABLE

| ITEM | COATING MATERIAL | QUANTITY (g/1000 lbs polymer) | ADDITIVES (g/1000 lbs polymer) | DENSITY (lbs/ft³) | AVG COOL (Sec.) |
|---|---|---|---|---|---|
| I | MYVE | 1600 | 300 Zn | 1.3 | 22.6 |
| II | MYVE | 2000 | 300 Zn | 1.32 | 19.4 |
| III | MYVE | 2300 | 300 Zn | 1.36 | 18 |
| IV | MCL | 1500 | 300 Zn | 1.32 | 54.7 |
| V | MCL | 1830 | 300 Zn | 1.3 | 48 |
| VI | MCL | 2300 | 300 Zn | 1.27 | 45 |
| VII | GMS | 450 | 300 Zn | 1.26 | 53.5 |
| VIII | GMS | 550 | 300 Zn | 1.3 | 48.7 |
| IX | GMS | 690 | 300 Zn | 1.3 | 51.4 |
| X | ACP | 225 | 225 Zn | 1.31 | 47.6 |
| XI | ACP | 275 | 275 Zn | 1.29 | 48.1 |
| XII | ACP | 345 | 345 Zn | 1.27 | 50.5 |
| XIII | GTS/GMS | 450 | 300 Zn | 1.31 | 30.6 |
| XIV | GTS/GMS | 550 | 300 Zn | 1.3 | 26.1 |
| XV | GTS/GMS | 690 | 300 Zn | 1.3 | 18.9 |
| XVI | MYV | 450 | 300 Zn | 1.33 | 34.7 |
| XVII | MYV | 550 | 300 Zn | 1.33 | 42 |
| XVIII | MYV | 690 | 300 Zn | 1.3 | 25.5 |

MYVE = MYVACET/water emulsion (27.5% MYVACET 9-40, 7.5% TWEEN 80, 655 water).
MCL = MICHEMLUBE (423) (a polyethylene wax).
GMS = Glyceride Monostearate.
ACP = Amorphus Calcium Polysilicate.
GTS/GMS = 50/50 mix of glyceride monostearate and glyceride tristearate.
MYV = Pure MYVACET 9-40 (no emulsion).
Zn = Zinc Stearate.

As can be seen from the above table, use of expandable styrene polymers coated in accordance with the present invention (Items I–III) resulted in reduced cooling time as compared to polymers coated with comparable amounts of the other coating materials.

Other features, benefits and advantages of the present invention will be readily apparent to those skilled in the art. While the invention has been described in detail relative to specific embodiments, variations and modifications of such embodiments can be effected within the spirit and scope of this invention as defined by the following claims.

What we claim is:

1. A method for preparing particulate expandable styrene polymers having a coating of a distilled acetylated monoglyceride comprising:
   introducing the particulate expandable styrene polymer into a mixing vessel;
   preparing an emulsion of the distilled acetylated monoglyceride, water and a suitable surfactant;
   adding an effective amount of the emulsion to the particulate expandable styrene polymer with mixing; and
   removing the excess water from the particulate expandable styrene polymer.

2. The method as recited in claim 1 wherein the emulsion contains from 5–75% by weight acetylated monoglyceride.

3. The method as recited in claim 1 wherein the emulsion contains between 15 and 50% by weight of the distilled acetylated monoglyceride.

4. The method as recited in claim 1 wherein the weight ratio of acetylated monoglyceride to surfactant in the emulsion is approximately 3.5:1.

5. The method as recited in claim 1 wherein the emulsion is comprised of approximately 27.5% by weight distilled acetylated monoglyceride, 7.5% by weight surfactant and 65% by weight water.

6. The method as recited in claim 1 wherein the surfactant is a polyoxyethylene (20) sorbitan monooleate.

7. The method as recited in claim 1 further comprising adding an effective amount of an anti-lumping agent to the particulate expandable styrene polymer and emulsion with mixing.

8. The method as recited in claim 1 wherein the effective amount of the emulsion is between approximately 0.1 to 1.0% by weight based on the weight of the expandable styrene polymer to be coated.

9. Expandable particles of a styrene polymer containing a blowing agent, said particles having a surface coating comprising a distilled acetylated monoglyceride which is a liquid at room temperature.

10. The expandable particles of styrene polymer recited in claim 9 wherein the higher fatty acid moiety of the acetylated monoglyceride has from about 8 to about 22 carbon atoms.

11. The expandable particles of styrene polymer recited in claim 9 wherein the coated particles contain approximately 400 parts per million of the acetylated monoglyceride.

12. A method of molding particles from particulate expandable styrene polymers comprising:
   introducing the particulate expandable styrene polymer into a mixing vessel;
   preparing an emulsion of a distilled acetylated monoglyceride, water and a suitable surfactant;
   adding an effective amount of the emulsion to the particulate expandable styrene polymer with mixing;
   removing the excess water from the particulate expandable styrene polymer;
   introducing the coated particulate expandable styrene polymers into a mold;
   applying heat to the mold above the boiling point of the expanding agent thereby causing the expandable particulate styrene polymer to expand.

13. The method as recited in claim 12 wherein the emulsion contains from 5–75% by weight acetylated monoglyceride.

14. The method as recited in claim 12 wherein the emulsion contains between 15 and 50% by weight of the distilled acetylated monoglyceride.

15. The method as recited in claim 12 wherein the weight ratio of acetylated monoglyceride to surfactant in the emulsion is approximately 3.5:1.

16. The method as recited in claim 12 wherein the emulsion is comprised of approximately 27.5% distilled acetylated monoglyceride, 7.5% surfactant and 65% water, also such percents by weight.

17. The method as recited in claim 12 wherein the surfactant is a polyoxyethylene (20) sorbitan monooleate.

18. The method as recited in claim 12 further comprising adding an effective amount of an anti-lumping agent particulate expandable styrene polymer and emulsion with mixing.

19. The method as recited in claim 12 wherein the effective amount of the emulsion is approximately 0.1 to 1.0% weight based on the weight of the expandable styrene polymer to be coated.

20. The method as recited in claim 12 wherein the effective amount of the emulsion is approximately 0.4% by weight based on the weight of the expandable styrene polymer to be coated.

* * * * *